UNITED STATES PATENT OFFICE

BENJAMIN F. STEPHENS, OF BROOKLYN, NEW YORK.

IMPROVED METHOD OF PREPARING BEEF, &c.

Specification forming part of Letters Patent No. 91,176, dated June 8, 1869.

*To all whom it may concern:*

Be it known that I, BENJAMIN F. STEPHENS, of the city of Brooklyn, Kings county, New York, have invented and made a new and useful Method of Preparing Beef and other Animal Substances; and I do hereby declare the following to be a correct description of the said invention and of the features distinguishing the same from methods before pursued.

Meat has been boiled to extract the nutritive qualities, and the extract condensed by evaporation of the aqueous portion. This method involves the necessity of evaporating large quantities of water, and the meat loses its natural taste to a large extent, and the animal fiber and tissues become an entire loss. In instances where meat has been dried in strips it was not in a condition for immediate use, as it requires to be soaked or cooked considerably to make it palatable.

My improvement is for facilitating the curing of the animal substance and for facilitating the cooking thereof for immediate use. At the same time the animal fibers and tissues are retained, so that what nutriment they contain is not lost, and they give body to the article I manufacture.

I take the beef, mutton, or other animal substance and remove the skin, bones, fat, and refuse material, and then separate the meat into small or very thin pieces by cutting or grinding, and dry or partially dry the same either by exposure to the sun's rays or in a drying-room, and, if desired, surplus fatty or oily or watery portions may be pressed out.

This mode of preparing the meat by cutting or grinding it up into small pieces greatly facilitates the drying with rapidity and uniformity, in order that it may be in a condition adapted to the subsequent grinding, and not be hard on the outside and comparatively moist on the inner portions, as now usual with dried meats. The animal substance is then to be ground up to the desired fineness, so as to make a flour from meat, and this may be seasoned with salt or spices, or dried and ground vegetable substances may be added, and the mass packed in boxes, canisters, or other vessels, and the air excluded, to aid in the preservation. Substances prepared in this manner are preserved from rapid change or decomposition in consequence of the dryness of the animal matter, and said animal substance, being in a comminuted state, is cooked with great facility, the water coming in contact with all portions with rapidity.

This animal-flour forms good soups and stews, possessing all the nutriment of fresh meat. It may also be employed to advantage in various culinary operations, and can be used for flavoring different dishes. Lobster-flour may thus be prepared and employed.

This animal-flour can be prepared where meat is cheap, and hence the cost will be much less, in many places, than fresh meat. For long voyages, army and navy supplies this article supplies a want heretofore experienced for the lack of fresh meat, and space and weight of transportation are lessened.

My method of preparing meat produces a new and useful article of manufacture.

When the atmosphere is excluded, the aforesaid material can be preserved for a longer time, and according to the quality of the animal substance and the circumstances under which it is to be preserved, so the air may be excluded, more or less.

I do not claim dried and ground meat, as I am aware that the same has before been used.

What I claim, and desire to secure by Letters Patent, is—

The preparation of animal substances by grinding the same up into small pieces previous to drying, so as to render the drying more uniform and rapid, and then grinding the same into a flour, as and for the purposes set forth.

In witness whereof I have hereunto set my signature this 10th day of February, 1869.

BENJ. F. STEPHENS.

Witnesses:
   CHAS. H. SMITH,
   GEO. T. PINCKNEY.